United States Patent [19]

Hargadon

[11] 3,872,757

[45] Mar. 25, 1975

[54] IMPROVED BISCUIT CUTTER AND METHOD OF MAKING SAME

[76] Inventor: Charles D. Hargadon, 13803 Shelbyville Rd., U.S. 60, Louisville, Ky. 40223

[22] Filed: Nov. 2, 1973

[21] Appl. No.: 412,306

[52] U.S. Cl. .................................. 83/691, 425/298
[51] Int. Cl. ............................................ B26f 1/14
[58] Field of Search ...... 83/620, 687, 691; 425/298, 425/300

[56] References Cited
UNITED STATES PATENTS

| | | | |
|---|---|---|---|
| 1,177,835 | 4/1916 | Van Houten, Jr. | 425/300 |
| 1,295,024 | 2/1919 | Gosiewski | 425/298 |
| 1,503,666 | 8/1924 | Roberts | 425/298 |
| 1,945,755 | 2/1934 | Scruggs, Jr. | 425/298 |
| 2,950,693 | 8/1960 | Filitl et al. | 425/298 X |
| 3,154,986 | 11/1964 | Reid | 83/326 X |

*Primary Examiner*—Andrew R. Juhasz
*Assistant Examiner*—William R. Briggs
*Attorney, Agent, or Firm*—Edward M. Steutermann

[57] ABSTRACT

A biscuit cutter having a sheet metal base with long side edges, relatively short transverse end edges and a multiplicity of uniformly spaced cup-receiving circular holes arranged in parallel transverse rows; and a multiplicity of individual hexagonal cups, one for each hole. The lower end portion of each cup tapers into a bottom circular neck dimensioned to extend snugly through a base hole when the cups are assembled on the base. The hexagonal body of each cup is dimensioned so that, when assembled, the cups nest together with their sides fitting snugly flush against the adjacent sides of adjacent cups in adjacent holes. The hexagonal mouth-forming portions of the sides of the cups are tapered obliquely outward to a cutting edge. The bottom circular end portion of each base opening is chamfered while the bottom circular end portion of each neck is expanded outwardly against the chamfer to secure the neck mechanically to the base. The snugly fitting sides are secured and sealed by silver solder bands along the hexagonal mouths of the cups. The top base surface between the holes and the adjacent surface portions of the cup tapers cooperate to form a system of interconnected passageways which terminate in openings along the peripheral edge of the honeycomb. The mouths of each peripheral opening is closed and sealed with a suitable material, such as a resinous plastic.

10 Claims, 11 Drawing Figures

PATENTED MAR 25 1975    3,872,757
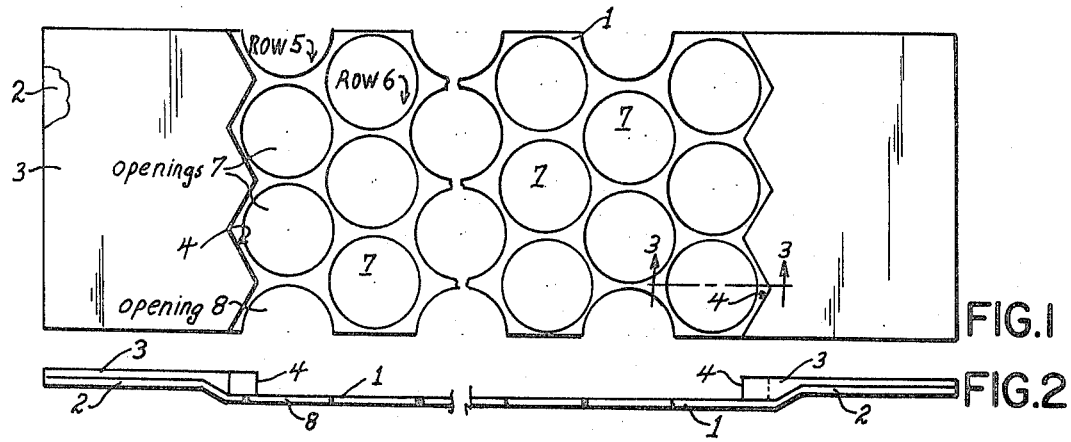
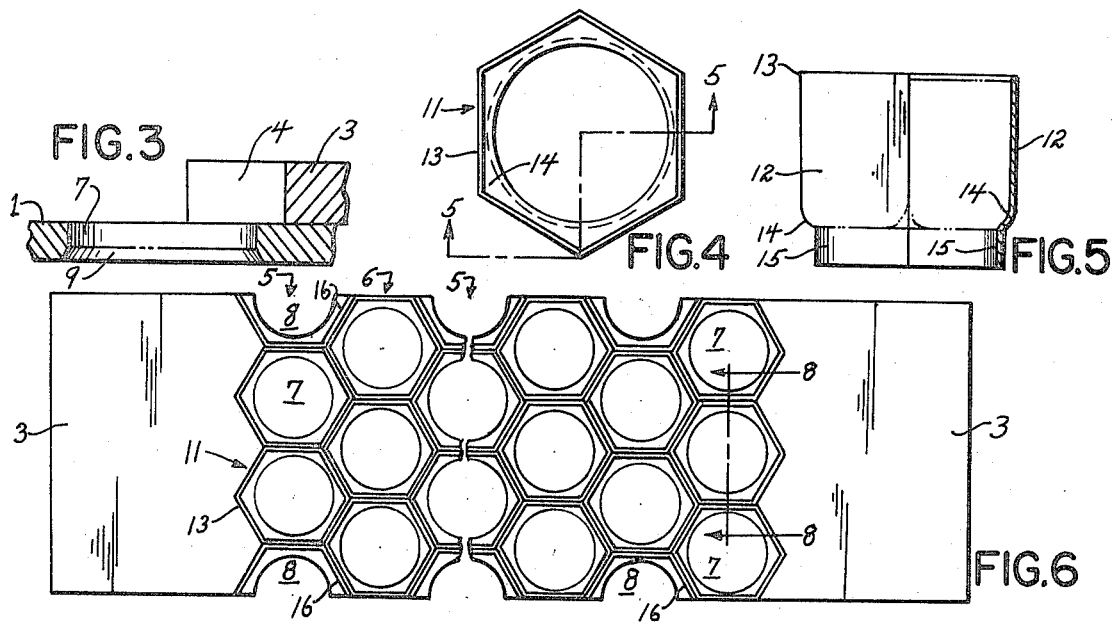
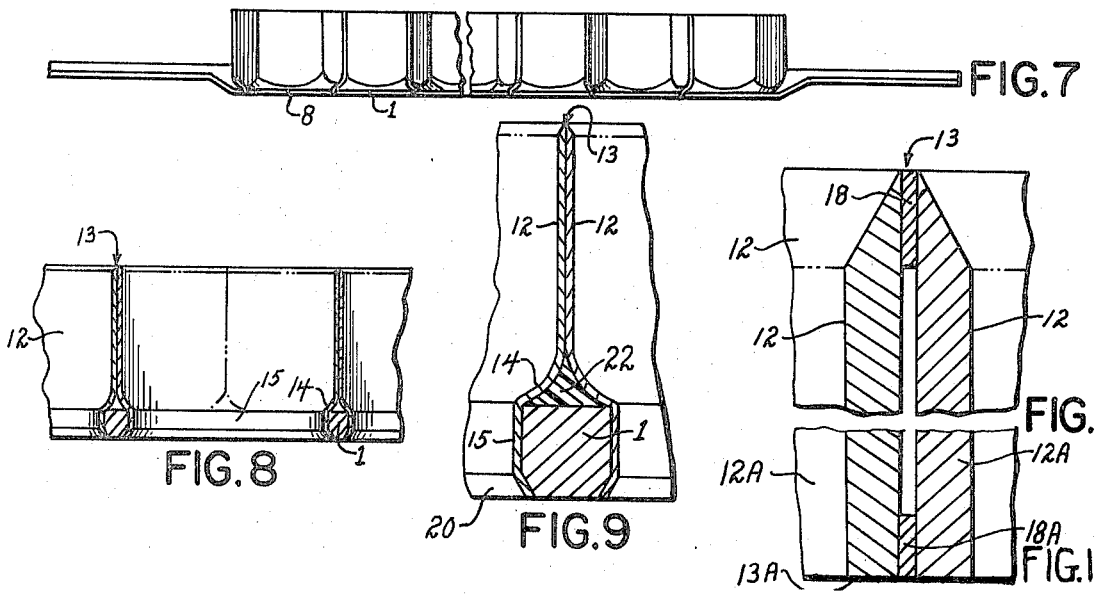

3,872,757

IMPROVED BISCUIT CUTTER AND METHOD OF MAKING SAME

BACKGROUND OF THE INVENTION

1. Field of the Invention

This invention relates to the biscuit cutting art wherein a uniformly thick sheet of dough is pressed against a honeycomb of cups so that each cup severs a biscuit from the dough and holds that biscuit for subsequent removal and packaging.

2. Description of the Prior Art

One presently used prior art biscuit cutter of the honeycomb type comprises: a cast metal honeycomb characterized by a longitudinal succession of 24 transversely extending rows of hexagonal cups; and a pair of flat end lugs, one at each end of the succession. These rows alternately comprise: one transverse row of three full cups; and another transverse row of two full cups between a pair of half cups, one at each end of such row.

In manufacturing the foregoing honeycomb biscuit cutter, the end lugs and a multiplicity of longitudinally-short metal honey-comb sections are made of cast metal and then secured together. The multiplicity of honeycomb sections comprise: a sucession of five identical intermediate sections; and a pair of non-identical end sections. Each intermediate section includes five transversely extending rows, viz: a center row, embracing three full cups; a pair of flanking rows, one on each side of the center row, each flanking row beginning and ending with one-half cup and having two full cups in between; and a pair of vertically-split opposite-end rows, each beginning and ending with one-quarter cup, and having two half cups in between. One end section contains two transversely extending rows including: a three full cup row adjacent the lug section; and a vertically-split row of quarter cups separated by two half cups. The other end section embraces three transversely extending rows comprising: a three full cup center row; a flanking row of two half cups separated by two full cups on the lug side of the center row; and a vertically-split row on the other side of the center row. Each vertically-split row in each of the seven sections presents three transversely spaced vertically arranged end edges projecting longitudinally outward, each being the edge of one half of one side of one hexagonal cup.

These cast sections are assembled into a biscuit cutter by silver soldering the projecting edges of each (end and intermediate) section to the corresponding projecting edges of the section adjacent to it and by bonding the extreme end surfaces of the end sections to the corresponding end lug. Thereafter, the hex bore of each cup is milled at its cutting end by milling one flat wall of one cup and the adjacent flat wall of the adjacent cup at one time. The opposite end portion of the hex bore walls of each cup are unmilled and rough. After milling, the cutting edges of each cup are hand-filed to a sharp edge.

The prior art practice has a number of disadvantages. It requires the manufacture of a casting which takes time and money. It is difficult to perform the silver soldering and milling operations with a high degree of accuracy. The silver solder joints between sections are relatively weak and correspondingly subject to breakage. The rough end portions of the hex bore walls are difficult to clean. The cutting edges of the cup are readily damaged and their repair is laborious, expensive and often results in the loss of accuracy.

SUMMARY OF THE INVENTION

Objects Of The Invention

The principal object of the invention is to overcome most if not all of the disadvantages of the prior art practice. More particularly, the more important objects are: to provide a method of making honeycombs which is not only easier, cheaper and better to perform but which also renders the bore wall of each cup smooth and easy to clean; to secure the cup together by an easily performed silver soldering operation which insures both strength and accuracy; and to eliminate the hand-filing of the cutting edges and the time and expense required to hand-file.

Other objects are to render the performance of repairs easier, less expensive and accurate and to facilitate honeycomb cleaning.

Statement of the Invention

Substantially all of the objects of this invention are achieved in a honeycomb structure comprising: a flat sheet metal base having a multiplicity of cup-receiving holes, one for each cup, each hole being chamfered at one end; and a multiplicity of individual "honeycomb nestable" sheet metal cups, one for each hole, the preferred form of each cup having a top mouth-end portion, the wall thickness of which tapers "annularly" outward to a knife-like edge, and a bottom end portion tapering into a bottom neck, which is shaped and dimensioned to extend snugly through its base hole when the cups are assembled on the base, the identically shaped bodies of the cups being dimensioned so that, when assembled, the cups nest together with their sides fitting snugly flush against the adjacent sides of adjacent cups in adjacent holes, the bottom end portion of each neck being slightly flared to extend obliquely outward snugly against the chamfer of its base opening so as to clamp the base between flare and taper of the cup and thus secure the cup mechanically and tightly to the base; and a band of silver solder extending along the outer periphery of the mouth end portion of the cups to bond the cups together.

The base of the foregoing structure can be easily, quickly and accurately die cut with relatively little expense once the die is made. Each nestable full cup can be easily and quickly drawn in a series of dies which reduce its "diameter" and increase its depth progressively and accurately until it can be easily and quickly drawn to final size in one final operation which contemporaneously forms its cutting edge portion with a tapered knife-like edge. Each half cup can be easily, quickly and accurately formed by sawing a full cup in half.

Obviously, it is easy to assemble the cups on the base to form the initial honeycomb, to expand the bottom end portion of each cup obliquely outward against the chamfers of the base opening (with or without sealing material interposed between the bottom flare of the cup and the bottom chamfer of its base opening) and thereby quickly and securely anchor the cup to the base, and to provide a sanitary seal along the chamfer. Furthermore, it is easy to heat the cutting end portion of the cups sufficiently to provide a strong and effective silver solder bond between cups without damaging the knife-like edges of the cups. Finally, if the base end portions, which project outwardly beyond the honeycomb, are not strong and rigid enough to function satisfactorily as lugs, it is easy to build up the strength and rigidity of each lug by bonding one or more layers of sheet metal thereto.

While the invention is broadly applicable to honeycomb nestable cups, i.e. square cups, hexagonal cups, or cups of other nestable shapes, the description hereafter made of the invention will be limited to hexagonal cups simply for the sake of clarity.

BRIEF DESCRIPTION OF THE DRAWINGS

The invention is illustrated in the accompanying drawings wherein:

FIG. 1 is a broken top plan view of a base made in accordance with the present invention;

FIG. 2 is a side edge elevation of FIG. 1;

FIG. 3 is an enlarged section taken along lines 3—3 of FIG. 1;

FIG. 4 is a top plan view of an individual hexagonal cup;

FIG. 5 is a view corresponding to one taken along lines 5—5 of FIG. 4;

FIG. 6 is a broken plan view of a honeycomb with the cups of FIGS. 4-5 assembled on the base of FIGS. 1-3;

FIG. 7 is a side elevational view of the honeycomb of FIG. 6;

FIG. 8 is a section corresponding to one taken along lines 8—8 of FIG. 6;

FIG. 9 is an enlarged fragmentary view showing the manner in which the bottom end of a cup is secured to the base and the openings between the base and adjacent cup tapers are plugged;

FIG. 10 is a somewhat exaggerated enlarged fragmentary view of the cutting end shown in FIG. 9, this view showing the silver solder connection between the mouth end portions of the adjacent side walls of adjacent cups; and FIG. 10A is a somewhat exaggerated enlarged fragmentary view of the opposite end of a modified form of honeycomb forming cup.

DESCRIPTION OF THE PREFERRED EMBODIMENT

The biscuit cutter illustrated in FIGS. 1-10 comprises: a base; and a multiplicity of honeycomb nestable cups of hexagonal shape mounted on the base.

As seen in FIG. 1, the sheet metal base 1 has its opposite flat end portions 2 offset upwardly from the major horizontal plane of the base to provide the base with end lugs. As seen in FIG. 2, each end lug may be strengthened by bonding, to its upper face, an upper metal layer 3 of requisite thickness and shape. Preferably, the inner end edge of the upper layer 3 is serrated as indicated at 4 in FIGS. 1 and 3.

Between end lugs, the base 1 is provided with a multiplicity of uniformly-spaced cup-receiving die-cut holes arranged in parallel transversely extending rows. Proceeding from left to right in FIG. 1, these rows include odd numbered and evenly numbered rows 5 and 6 respectively. While each of these rows could include full circle openings only, the odd numbered row 5 preferably include two full circle openings 7 between two semicircular openings 8 while the evenly numbered rows 6 include three full circle openings 7. The rows 5 could include three or more full circle openings in which event the rows 6 would include four or more full circle openings. The bottom end portion of each full circular opening 7 and each semi-circular opening 8 is flared outwardly to provide corresponding circular and semi-circular chamfers 9.

The multiplicity of individual hexagonal cups shown includes one full cup 11 (see FIGS. 4 and 5) for each full circular opening 5. Each full cup 11 comprises: a body portion; a tapered portion; and a neck portion. Each body portion 12 preferably is composed of six equal sides accurately forming a true hexagon having an upper end and a lower end. The wall thickness of the upper end of the body 12 provides the cutting end portion of the cup; hence, it tapers annularly outward to a knife-like edge 13 as seen in FIGS. 9 and 10. Its tapered portion 14 tapers inwardly from the lower end of the body portion 12 to a true circular cross-section at its lower end. Its neck portion 15, which is, of true circular shape, depends from the lower end of the tapered portion and is dimensioned to fit snugly within a full circular base opening 7, when the cup is assembled on the base. These hexagonal bodies 12 are dimensioned so that, when assembled on the base 1, they meet to form a honeycomb with their sides fitting snugly flush against the adjacent sides of adjacent cups in adjacent holes.

The multiplicity of individual hexagonal cups also includes a half cup 16 for each semi-circular opening 8. Each half cup preferably is formed by sawing a full cup 11 into one usable 3-sided half; hence, each usable half cup has corresponding body, tapered and neck portions 12, 14 and 15 with a knife-like edge 13 at the cutting end of the body portion 12.

Before the cups are inserted into the base holes, the chamfers 9 may be coated with an adhesive sealant while the peripheries of the bodies 12 may be coated (as seen in FIG. 10) with a silver solder band 18 of suitable width, say one-eighth to one-fourth of an inch more or less. Upon insertion of all cups, the lower end portion of each neck 15 is enlarged, preferably flared as indicated at 20 in FIGS. 8 and 9. Each flare 20 is tightly pressed against the adjacent chamfer 9 of its base opening and the base 1 is tightly clamped between the flare and tapered portion of the cup. Now it is a simple matter to heat the adjacent cutting ends of the adjacent cups sufficiently to cause the silver solder to bond those ends together.

When the cups are fully assembled, secured and bonded, the tapered portions 14 of adjacent cups and the adjacent top surface of the sheet metal base 1 cooperate to provide a network of interconnecting passageways, which terminate in triangular openings along the periphery of the cup assembly or honeycomb. For sanitary reasons, these openings should be plugged in a manner both preventing the existence of dirt-accummulating cracks and crevices and facilitating easy and thorough cleaning. This may be readily accomplished by plugging each opening with a suitable sealing material 22 such, for example, as a suitable synthetic resin or some other suitable plastic material which readily hardens into a firm, solid and closely-fitting plug.

From the foregoing, it will be appreciated that the ultimate honeycomb structure achieves substantially all of the objects stated in the Statement Of Invention. The base 1 can be easily and quickly made at low cost with a very high degree of accuracy. Each cup can be easily and quickly drawn in a series of dies and ultimately drawn to final size in a highly accurate operation which contemporaneously forms the cutting edge. Obviously it is easy to coat the chamfers, to provide each cup with a silver solder band and to assemble the cups on the base to form the initial honeycomb. It is easy to expand the bottom end portion of each cup obliquely against its chamfer, with or without sealing material on the chamfer, and thereby quickly and securely anchor the cup to the base in a manner providing a sanitary seal along the chamfer. Again it is easy to bond the cups without damaging the knife-like edges. The triangular peripheral openings can be easily and quickly sealed to complete the operation. The resulting product is smooth-walled, hence, easy to clean and to keep clean. If one or more cups are damaged, it is an easy matter to remove and replace each cup accurately within its original position.

While a flat based honeycomb is preferred, the honeycomb may be made in arcuate or cylindrical form for use in a rotary biscuit cutter.

MODIFICATION

In operation of the biscuit cutter shown in FIGS. 1-10, the biscuit-forming dough enters the cutting end of each cup and is removed from the same end. In some biscuit cutters, the dough enters the cutting end and is removed from the opposite or noncutting end. To provide a biscuit cutter of this latter type, the biscuit cutter of FIGS. 1-10 may be modified as indicated in FIG. 10A by omitting the base and the tapered portion and neck of the cups, leaving only the body portion in the form of an open-ended cylinder of hexagonal or other honeycomb nestable cross-section and by securing the peripheries of these cups together in any suitable manner.

Reverting again to the biscuit cutter of FIGS. 1-10, it may be broadly described as comprising: a multiplicity of individual cups shaped to nest each other to form a honeycomb, each cup having a honeycomb nestable body portion terminating at one of its ends in a knife-like edge; and bonding means securing the body portion of adjacent cups to each other. This much of the embodiment shown in FIGS. 1-10 is common to the modification indicated in FIG. 10A which eliminates the base 1 and the tapered and circular neck portions 14 and 15 of each cup. This modification requires the body portion 12A of each cup to terminate at the other of its opposite ends in a non-cutting bottom edge portion 13A; and includes bonding means 18A securing the body portion of adjacent cups to each other. The cups may be secured together by spot welding. Preferably they are secured along the cutting and non-cutting end portions of their adjacent peripheries by bands of silver solder comprising band 18 shown in FIG. 10 and band 18A similar to the band 18. A succession of transverse rows of such cups, when secured together in a single unit, would be provided with end lugs (not shown) secured to the end rows.

The modified honeycomb may be flat, arcuate or cylindrical.

I claim:

1. A biscuit cutter comprising:
A. a base means having a pair of laterally spaced end portions with a sheet-like body portion extending longitudinally from one end portion to the other and secured to both, and a multiplicity of uniformly spaced cooperative cup-receiving holes formed in said body portion;
B. a multiplicity of individual nestable cutter cup means: each cutter cup means having:
   a. peripheral first wall member means including at least two straight sides, each wall member means terminating in an upper end, wherein said upper ends of said first wall member means define a first opening of selected configuration to said cutter cup,
   b. tapered second wall means carried by selected first wall member means to taper inwardly from the lower ends of said first wall member means to define a neck at the end of said cup opposite said upper end which neck has a diameter less than the mean diameter of said first opening and is adapted to be received by a selected base hole when the cup is assembled upon said base;
C. means for releasably securing said neck to the base so a portion of at least one straight side of each cup is disposed generally parallel to and in contiguous relation with a portion of at least one straight side of an adjacent cup and so that the upper ends of straight sides of said cups disposed generally in contiguous relation are likewise in contiguous relation along the length thereof and said upper ends of said cups are in generally the same plane, so that a cutting edge is formed by the upper ends of the straight sides of adjacent cup members; and
D. means bonding a portion of adjacent cups together along a portion of the contiguous straight sides of the cups.

2. The biscuit cutter of claim 1 wherein:
A. said base holes are circular in shape.

3. The biscuit cutter of claim 2 wherein:
A. each hole formed in said body portion of said base is chamfered at the lower end portion of the hole.

4. The biscuit cutter of claim 2 wherein:
said neck is of circular shape dimensioned to fit snugly within a base hole.

5. The biscuit cutter of claim 1 wherein:
A. each cup is secured to the base by enlarging the lower end portion of the neck so as to clamp the base between the taper of the neck and the lower end enlargement thereof.

6. The biscuit cutter of claim 5 wherein:
A. The lower end portion of each hole in said base is chamfered; and
B. said enlargement is in the form of an outward flare tightly pressed against the chamfer of the hole.

7. The biscuit cutter of claim 1 wherein:
A. said base holes are circular in shape and arranged in parallel transversely extending rows alternately containing at least two full circular openings located between two semi-circular openings in one row and at least three full circular openings in the next row.

8. The biscuit cutter of claim 7 wherein:
A. each of said cups include:
   1. First wall member means arranged to provide a cup body having a hexagonal cross-section so said opening to said cup means is in the shape of a regular hexagon.
   2. said second wall means tapering inwardly from the lower end of the hexaongal body portion formed by said first wall means to a circular cross-section at its lower end; and
3. a circular neck depending from the circular lower end of said second wall means.

9. A biscuit cutter comprising:
A. a multiplicity of individual cups:
1. each cup including at least three substantially straight wall members of substantially equal length arranged to form a cup body of a regular geometric cross-section wherein each of said wall members terminates at its upper end in an outwardly tapering knife-like edge so that a substantially continous knife like edge is provided around the upper end of each cup; and
B. means releasably bonding wall members of each cup to wall members of adjacent cups in an arrangement such that at least two wall members of each cup are in contiguous relation with a wall member of adjacent cups, and so upper ends of said cups are in generally the same plane and so said knife-like edges of adjacent cups are in contiguous relation to cooperatively form a cutting edge of generally V shaped cross-section so that individual cups within said biscuit cutter can be released, removed from said cutter and replaced by another cup.

10. The biscuit cutter of claim 9 wherein:
A. said cups are arranged to form a succession of two or more transverse rows and
B. said bonding means secures the cups of one row to the cups of the adjacent row along both the knife edge portion and opposite end portions of their respective adjacent peripheries.

* * * * *